US012186719B2

(12) United States Patent
Carespodi

(10) Patent No.: US 12,186,719 B2
(45) Date of Patent: Jan. 7, 2025

(54) SPRAYER UNIT

(71) Applicant: Control Solutions, Inc., Pasadena, TX (US)

(72) Inventor: John Carespodi, Pasadena, TX (US)

(73) Assignee: Control Solutions, Inc., Pasadena, TX (US)

( * ) Notice: Subject to any disclaimer, the term of this patent is extended or adjusted under 35 U.S.C. 154(b) by 0 days.

(21) Appl. No.: 18/440,659

(22) Filed: Feb. 13, 2024

(65) Prior Publication Data

US 2024/0181407 A1 Jun. 6, 2024

Related U.S. Application Data

(62) Division of application No. 16/880,749, filed on May 21, 2020, now Pat. No. 11,980,857.

(60) Provisional application No. 62/851,525, filed on May 22, 2019.

(51) Int. Cl.

| | |
|---|---|
| ***B01F 25/72*** | (2022.01) |
| ***B01F 25/74*** | (2022.01) |
| ***B01F 35/75*** | (2022.01) |
| ***B05B 7/04*** | (2006.01) |
| *B01F 25/00* | (2022.01) |

(52) U.S. Cl.

CPC .............. *B01F 25/72* (2022.01); *B01F 25/74* (2022.01); *B01F 35/7543* (2022.01); *B05B 7/04* (2013.01); *B01F 2025/9191* (2022.01); *Y10T 137/2087* (2015.04)

(58) Field of Classification Search

CPC ...... B01F 25/72; B01F 25/74; B01F 35/7543; B01F 2025/9191; B05B 7/04; B05B 7/2427; B05B 7/2445; B05B 7/2462; B05B 7/2467; B05B 15/58; Y10T 137/2087

USPC .......................................... 239/310; 137/808

See application file for complete search history.

(56) References Cited

U.S. PATENT DOCUMENTS

| | | | | |
|---|---|---|---|---|
| 4,512,955 | A * | 4/1985 | Etani | B01F 21/22 137/268 |
| 8,672,678 | B2 | 3/2014 | Gramann et al. | |
| 9,662,180 | B2 | 5/2017 | Boehm et al. | |
| 9,888,980 | B2 | 2/2018 | Boehm | |
| 9,974,629 | B2 | 5/2018 | Pauser | |
| 2016/0199805 | A1 | 7/2016 | LaCroix | |
| 2017/0081165 | A1 | 3/2017 | Bates et al. | |

OTHER PUBLICATIONS

"Midwest Dental True Definition Sprayer [Brochure]," 1 page, Feb. 12, 2020, Web page retrieved from https://www.mwdental.com/lava-cos-powder-spray-system.html.

* cited by examiner

*Primary Examiner* — John Bastianelli

(74) *Attorney, Agent, or Firm* — POLSINELLI PC

(57) ABSTRACT

A mixing apparatus including a mixing region can have an inlet and an outlet. The mixing region can be operable to couple with a solution housing, thereby defining a mixing chamber. A stem can extend from a surface of the mixing region and the inlet can be disposed at a distal end of the stem. A wing can disposed at a proximal end of the stem and adjacently engaged with the surface of the mixing region and have a leading edge and a trailing edge.

9 Claims, 5 Drawing Sheets

SPRAYER UNIT

CROSS-REFERENCE TO RELATED APPLICATIONS

The present application is a divisional of U.S. patent application Ser. No. 16/880,749, filed May 21, 2020, which claims priority to U.S. Provisional Application No. 62/851,525, filed May 22, 2019, the contents of which are incorporated by reference in their entirety herein.

FIELD

The present disclosure relates generally to systems for improving efficiency spray units.

BACKGROUND

Spray units are used to evenly distribute a product through atomization and/or particularization. Many spray units to receive a solution to be distributed and operably to be mixed with air, water, and/or other liquid/gas through an inlet prior to distribution via an outlet of the sprayer. However, under repetitive use, the mixing of the feed solution with the air, water, and/or other liquid/gas can cause blockage of the inlet, which can reduce and/or eliminate the distribution of the solution through the outlet. This reduction and/or elimination can cause uneven, patchy, or incomplete distribution of the solution through the outlet.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative examples, in which the principles of the disclosure are utilized, and the accompanying drawings of which:

DETAILED DESCRIPTION

Figure 1:
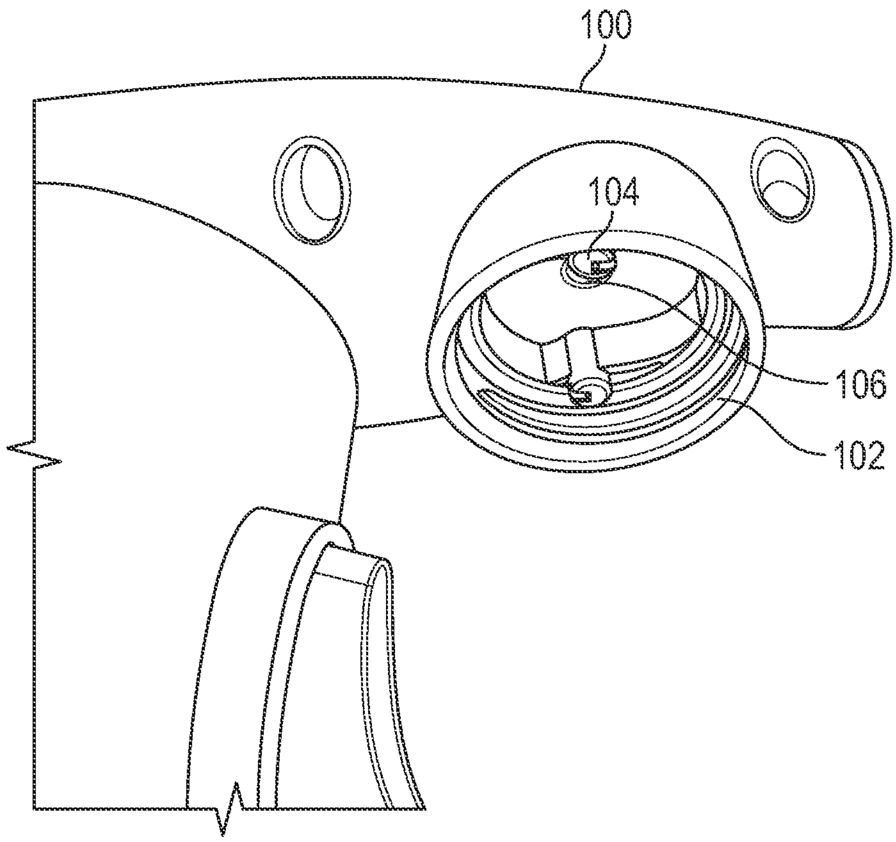
FIG. 1 is a bottom isometric view of a spray unit, in accordance with at least one instance of the present disclosure.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms “comprises,” “comprising,” “includes,” “including,” “has,” “having” or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: “for example,” “for instance,” “e.g.,” “In some examples,” and the like.

The present disclosure is drawn to a uniform sprayer operable to distribute a predetermined solution through an outlet. The sprayer can have an handle with an actuation element operable to engage the distribution of the solution along with a mixing region operable to engage with a solution housing and introduce a distribution medium (e.g. air, water, gas/liquid, etc.). The mixing region can have an inlet operable to introduce the distribution medium into the solution housing along with an outlet operable to allow the distribution medium along with the introduced solution to transfer through the outlet of the sprayer. The inlet of the mixing region can include a chamfer or wing formed therewith operable to introduce a predetermined motion of the distribution medium within solution housing, thereby preventing build of the solution, distribution medium, and/or combinations thereof around of the mixture inlet.

The present disclosure is more specifically drawn to the chamfer or wing provided around the mixture inlet operably to introduce a predetermined movement within the solution housing of the solution, distribution medium, and/or combinations thereof. In at least one instance, the chamber or wing can be operable to produce a rotational movement within the solution housing.

The introduction of the distribution medium into the mixing region can operably form a mixing chamber defined by the mixing region and the solution housing. The mixing chamber can receive at least a portion of a distribution medium through an inlet, thereby introducing the distribution medium to the solution within the solution housing and forming a mixture. The mixture can travel through an outlet within the mixing chamber due to a pressure differential induced by the introduction of the distribution medium into the mixing chamber. The mixing chamber outlet can be coupled with an outlet of the spray, thereby allowing the mixture to be evenly, efficiently distributed from the sprayer via the outlet.

FIG. 1 illustrates a sprayer according to at least one instance of the present disclosure. The sprayer 100 can have a mixing region 102 operable to engage with a solution housing having a solution therein (not shown), thereby forming a mixing chamber. The mixing region 102 can have an inlet 104 and outlet 106. The inlet 104 can operably introduce a distribution medium into the mixing chamber to interact with the solution forming a mixture. The pressure differential generated within the mixing chamber by introduction of the distribution medium draw the mixture through the outlet of the mixing region.

As can be appreciated in FIG. 1, the inlet 104 can be operably arranged to introduce the distribution medium into the mixing region 102 at a predetermined angle, thereby introducing a rotational and/or mixing spin to the distribution medium within the mixing region 102. The rotation and or mixing spin introduced by the inlet can ensure uniformity within the distribution medium while also allowing efficient flow to the outlet 106.

As described further below with respect to FIGS. 2 and 3, the sprayer 100 can include one or more mixing elements associated with the one or more inlets 104 to prevent build of the distribution medium adjacent to the inlet, thereby reducing the rotational and or mixing spin within the mixing chamber.

Figure 2:
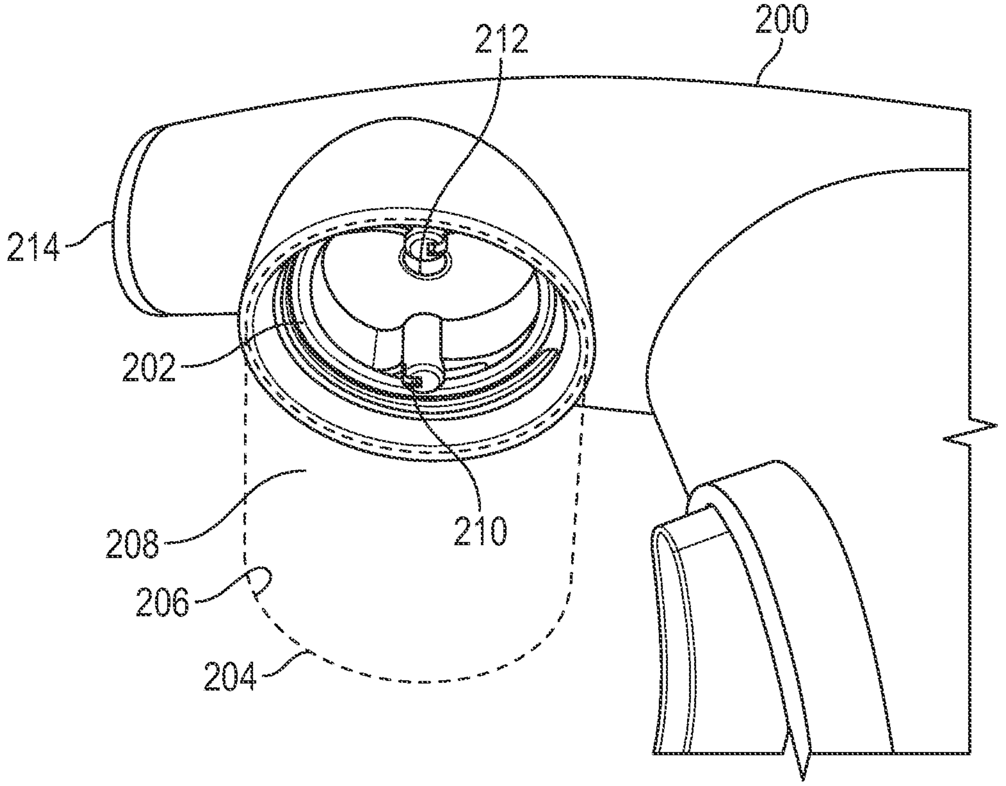
FIG. 2 is a bottom isometric view of a spray unit having a wing installed within a mixing region, according to at least one example of the present disclosure.
Figure 3:
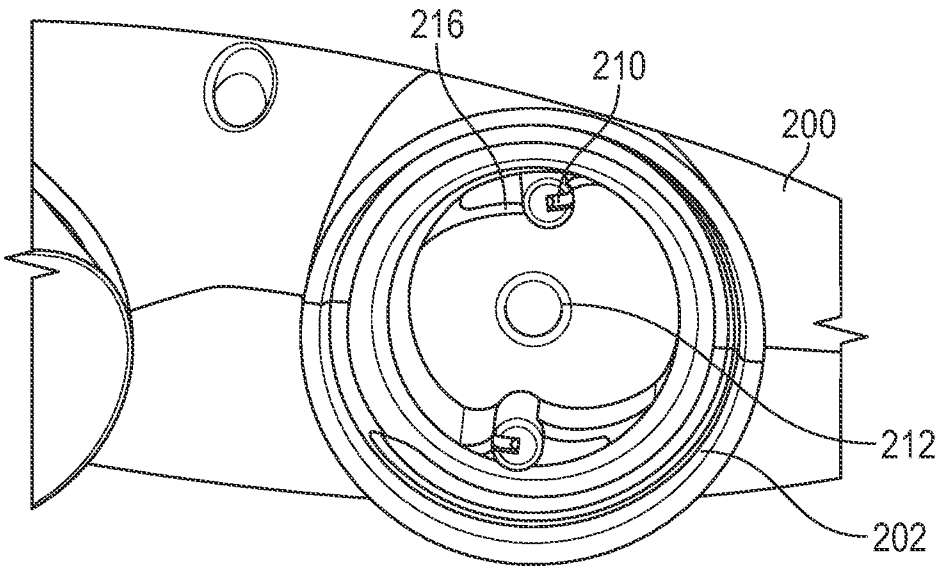
FIG. 3 is a bottom planar view of a spray unit having a wing installed within a mixing region, according to at least one example of the present disclosure.

FIGS. 2 and 3 illustrates a sprayer according to the at least one instance of the present disclosure. The sprayer 200 can have a mixing region 202 operable to engage with a solution housing 204 (shown in broken lines for clarity and illustrative of its removable nature) having a solution 206 received therein. The mixing region 202 and the solution housing 204 can collectively define a mixing chamber 208.

The mixing region 202 can have one or more inlets 210 and one or more outlets 212. The one or more inlets 210 can be operable to introduce a distribution medium into the mixing chamber 208, while the one or more outlets 212 can be operable to allow a mixture containing at least a portion of the distribution material and/or the solution 206 to exit the mixing chamber 208.

The solution housing 204 can be operable to receive the solution 206 therein. The solution 206 can be a powder, a liquid, a gel, and/or a dissolvable solid. Introduction of the distribution medium to the solution 206 can produce a mixture operably to be sprayed through the outlet 210 of the mixing region 202 and through the outlet 214 of the sprayer 200. The distribution medium can be water, air, and/or any other gas or liquid operable to interact with the solution 206 to form a desired mixture. The solution housing 204 and/or the mixing chamber 208 can be operably arranged to receive the solution 206 and/or the distribution material therein and form a substantially uniform mixture between the solution 206 and/or the distribution material. The substantially uniform mixture can include the distribution material dissolved into the solution, the distribution material suspended within the solution 206 as a transfer medium, and/or any combinations thereof. The outlet 212 can be in fluidic communication with an outlet 214 of the sprayer 200, thereby allowing the mixture to be distributed by the sprayer 200. In at least one instance, the solution housing 204 can be threadably engaged with the mixing region 202. In other instances, the solution housing 204 can be press-fit, latched, and/or other de-attachable coupling between the sprayer 100 and the solution housing 204.

The inlet 210 of the mixing region 202 can be operable to introduce the distribution medium into the mixing chamber 208. In at least one instance, the inlet 210 can include a stem 215 that extends a predetermined distance away from the surface of the mixing region 202. The inlet 210 can be operably arranged produce a predetermine movement (e.g. rotation, spin, and/or helical motion) of the distribution medium, the solution, and/or the mixture within the mixing chamber 208. The predetermined movement can include a lateral clockwise rotation, a lateral counter-clockwise rotation, a longitudinal clockwise rotation, a longitudinal counter-clockwise rotation, and/or any other movement or rotation of the distribution medium, solution, and/or mixture within the mixing chamber 208. In at least one instance, the inlet 210 can include a nozzle operably arranged to introduce the predetermine movement. In other instances, the inlet 210 can be angled and/or positioned within the mixing chamber 208 and/or solution housing 204 to induce the predetermined movement. In some instances, the sprayer 200 can include two or more inlets 210 operably arranged to collectively induce the predetermined movement. In yet other instances, the sprayer 200 can include two or more inlets 210 operably arranged to individually induce the predetermined movement, respectively.

The inlet 210 and/or the stem 215 can include a wing 216 operably arranged to guide and/or assist in movement of the distribution medium, solution, and/or mixture within the mixing chamber 208. The wing 216 can prevent buildup and/or collection of the distribution medium, solution, and/or mixture around the inlet 210 and/or the stem 215. Build up around the inlet 210 and/or the stem 215 can prevent even distribution of the mixture through the outlet 214 the sprayer 200, thereby reducing effectiveness and/or efficiency of the sprayer 200.

Figure 4:
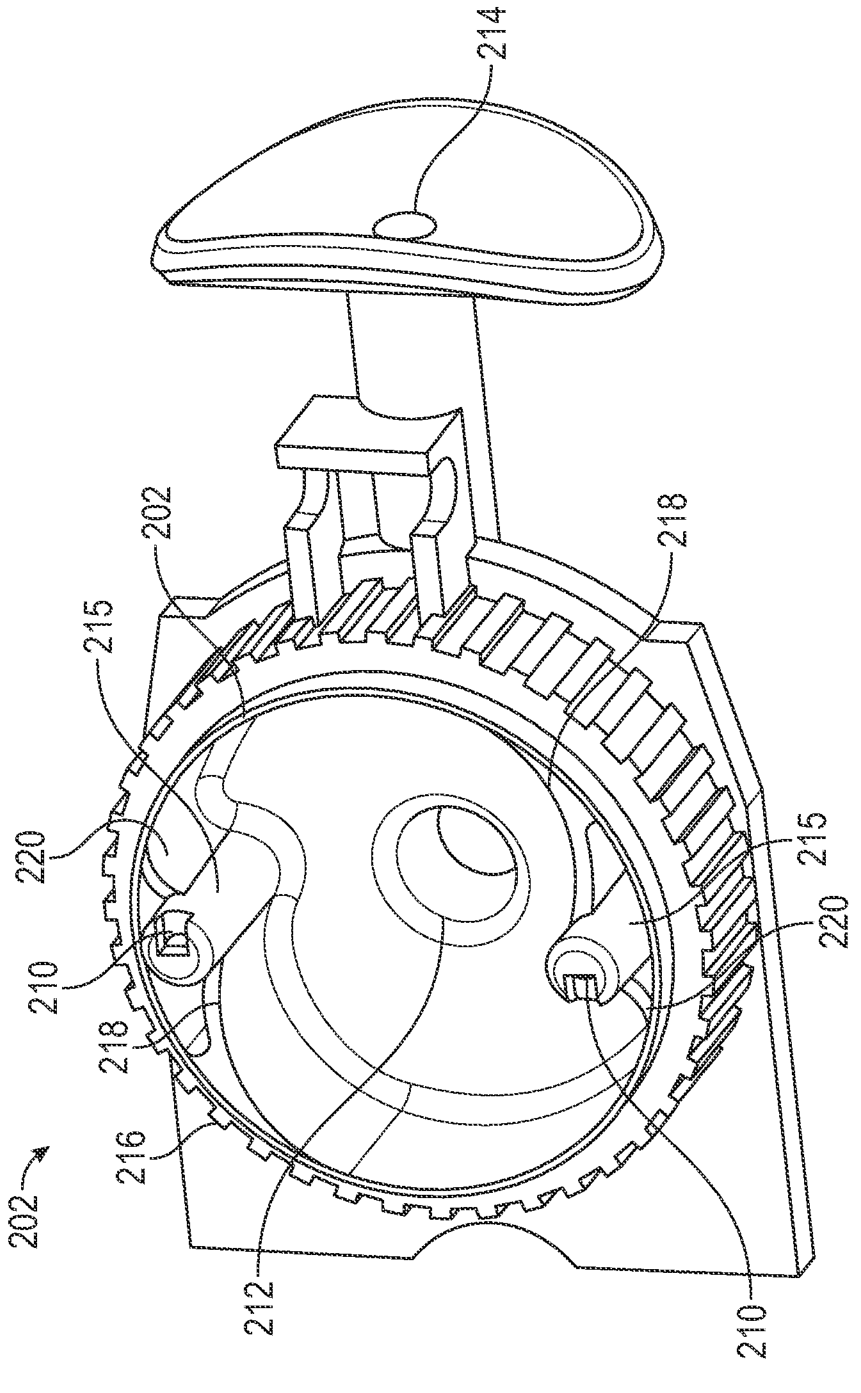
FIG. 4 is a bottom isometric view of a mixing region having a wing installed therein, according to at least one example of the present disclosure.
Figure 5:
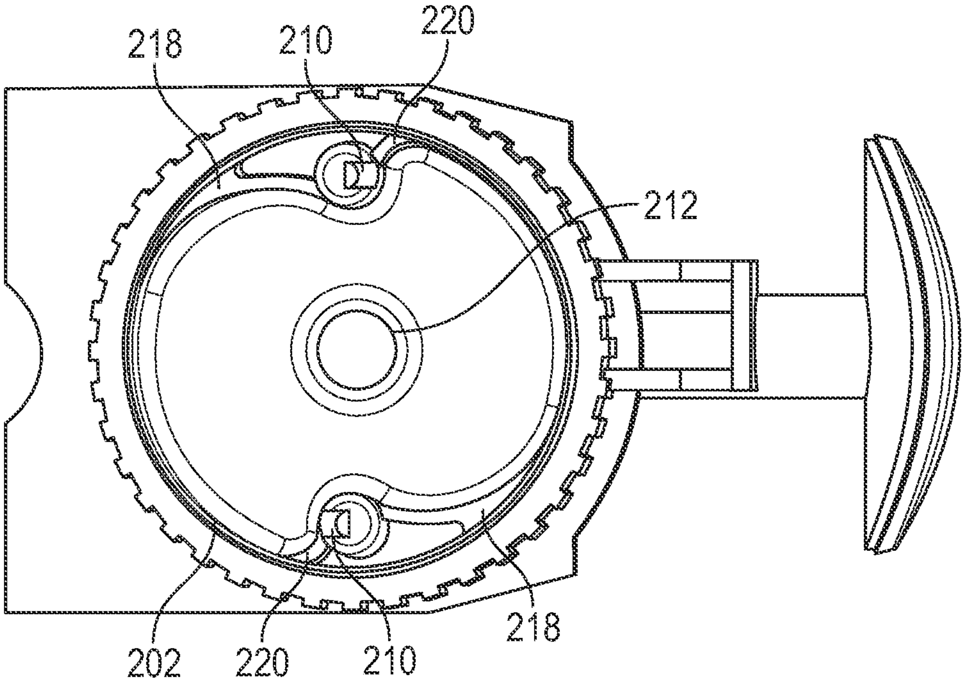
FIG. 5 is a bottom planar view of a mixing region having a wing installed therein, according to at least one example of the present disclosure.

FIG. 4 illustrates an isometric view of the mixing region 202 of a sprayer 200, in accordance with at least one instance of the present disclosure. FIG. 5 illustrates a planar view of the mixing region 202 of a sprayer 200, in accordance with at least one instance of the present disclosure. The mixing region 202 can have an inlet 210 disposed at a distal end of a stem 215 operably arranged to introduce a distribution medium into a mixing area 208.

A wing 216 can be disposed adjacent to a proximal end of the stem 215 opposite the inlet 210. The wing 216 can substantially surround at least a portion of the stem 215 including a leading edge chamfer 218 and trailing edge curvature 220. The chamfer 218 and the curvature 220 can reduce turbulent flow and/or eliminate buildup of the distribution medium, the solution, and/or the mixture within the mixing chamber 208, thereby allowing even distribution of the mixture through the outlet 214 of the spraying.

The leading edge chamfer 218 can be arranged to prevent buildup at the base of the stem 215 while the trialing edge curvature 220 can be arranged to prevent build up while also directing and/or inducing movement of the distribution medium, solution, and/or mixture within the mixing chamber 208.

The mixture can be induced through the outlet 212 of the mixing region 202 and to the outlet 214 of the sprayer 200 via a pressure differential generated by the introduction of the distribution medium into the mixing chamber 208. In at least one instance, the sprayer can include a trigger 222 operable to introduce the distribution medium into the mixing chamber 208, and thereby induce the pressure differential between the mixing chamber 208 and an adjacent environment. The distribution medium, solution, and/or mixture may exit the outlet as a foam, spray, and/or other aerosolized droplet formation.

While FIGS. 4 and 5 detail two inlets 210 and stems 215, each having a wing 216 associated therewith, it is within the scope of this disclosure to implement any number of inlets 210 and/or wings 216 within a mixing region 202 including, but not limited to, one inlet 210 and associated wing 216, three inlets 210 and associated wings 216, four inlets 210 and associated wings 216, or any other number of inlets 210 and associated wings 216.

Further, while FIGS. 1-5 are described with respect to a distribution medium, it is within the scope of this disclosure to have more than one distribution medium within mixing chamber 208. In at least one instance, each of the one or more inlets 210 can be operably arranged to introduce a distribution medium, respectively.

Figure 6:
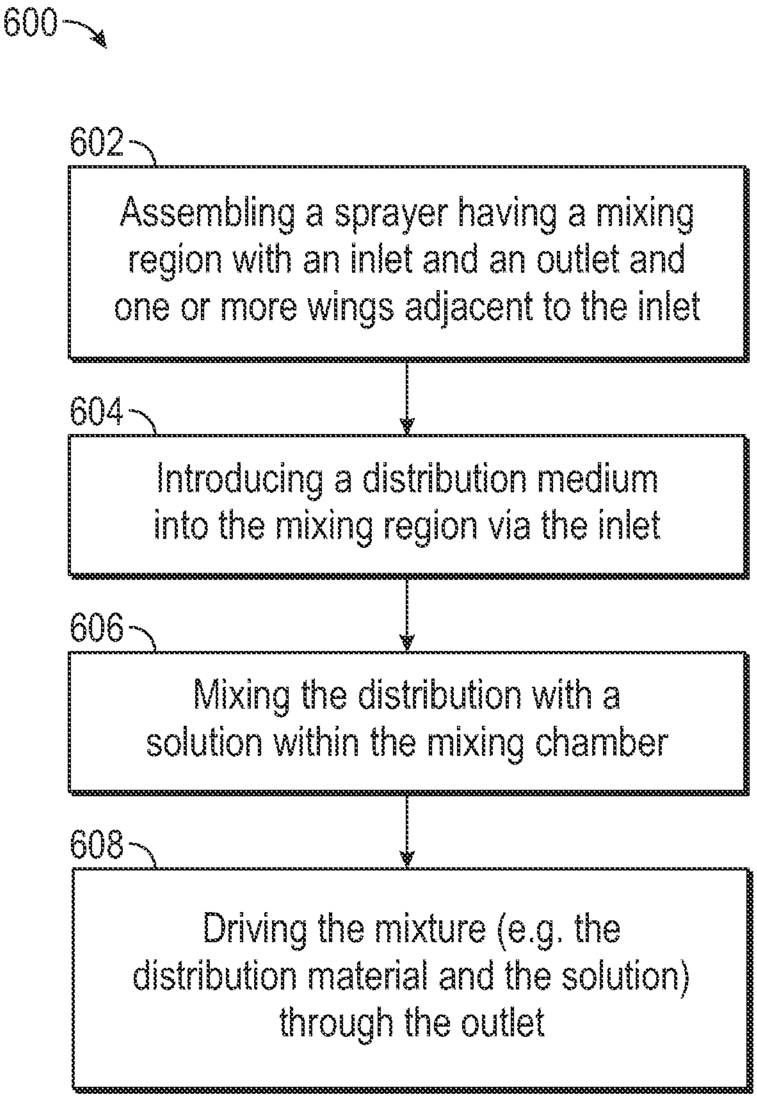
FIG. 6 is a flowchart of a method for use with a sprayer, according to at least one instance of the present disclosure.

FIG. 6 is a flow chart of an installation method for reducing turbulence and/or build up in a sprayer, according to at least one instance of the present disclosure. The method 600 can be implemented with respect to the apparatus and/or systems described in FIGS. 2-5, and while specific processes are described below, no specific order is intended and/or implied. Further, additional processes, sub-processes, and/or methods can be implemented within method 600 without deviating from this disclosure. The method can begin at block 602.

At block 602, a sprayer having a mixing region with an inlet and an outlet can be assembled with one or more wings adjacent to the inlet. The one or more wings can be adapted to guide and/or assist in movement of a medium within the mixing chamber. The method 600 can then proceed to block 602.

At block 602, a distribution medium can be introduced into the mixing region via the inlet. The distribution medium can be a gas, liquid, powder, aerosol, and/or any combination thereof. The inlet can be arranged to introduce a movement of the distribution medium within the mixing chamber. The method 600 can then proceed to block 604.

At block 604, the distribution medium can be mixed with a solution within the mixing chamber. The solution can a liquid, powder, solid (e.g. dissolvable solid), and/or any combination thereof. The solution and distribution medium can form a mixture via the movement within the mixing region. The one or more wings can be operable arranged around and/or adjacent to the inlet to prevent buildup of the distribution medium, solution, and/or mixture within the mixture chamber. The one or more wings can further be arranged to prevent turbulent flow within the mixing chamber. The method 600 can then proceed to block 606.

At block 606, the solution (e.g. the distribution medium and solution) can be driven through the outlet, thereby exiting the sprayer. The one or more wings can ensure even mixing of the mixture via reduction in turbulent flow and/or buildup within the mixing chamber.

While preferred examples of the present disclosure have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

What is claimed is:

1. A mixing system comprising:

a sprayer a having an inlet and an outlet in fluidic communication with a mixing region;

a solution housing detachably coupled with the sprayer, thereby defining the mixing region, the solution housing operably having a solution therein;

a stem extending from an inner surface of the sprayer, the stem extending from the inner surface at least partially into the mixing region, the inlet disposed at a distal end of the stem;

a wing disposed at a proximal end of the stem and adjacently engaged with the inner surface of the sprayer, the wing having a leading edge and a trailing edge, wherein the inlet is operable to introduce a distribution medium into solution housing, wherein the outlet is operable to eject the distribution medium and/or the solution from the solution housing and/or the mixing region.

2. The system of claim 1, wherein the distribution medium and/or the solution are operable to form a mixture in the solution housing and/or the mixing chamber.

3. The system of claim 2, wherein the mixture is ejected through the outlet via pressure differential between the mixing chamber and an environment.

4. The system of claim 3, wherein the sprayer includes a trigger operable to generate the pressure differential between the mixing chamber and the environment, thereby forming a spray solution including the distribution medium.

5. The system of claim 1, wherein the solution is a powder, a liquid, a gel, and/or a dissolvable solid.

6. The system of claim 1, wherein the wing induces rotational movement within the mixing chamber and/or solution housing.

7. The system of claim 1, wherein the leading edge of the wing is a chamfer and the trailing edge of the wing is concave curvature.

8. The system of claim 1, wherein the inlet has a nozzle disposed thereon.

9. The system of claim 1, wherein the sprayer includes two inlets, each inlet disposed at a distal end of a stem and having a wing formed at the proximal end of the stem, the wing having a leading edge and a trailing edge.

* * * * *